United States Patent [19]
Thompson et al.

[11] Patent Number: 4,959,017
[45] Date of Patent: Sep. 25, 1990

[54] ELECTRONIC LEARNING DEVICE FOR TEACHING HOW TO HANDLE MONEY

[75] Inventors: Barbara J. Thompson; Jesse Ursery, Jr.; William Holmes, Jr., all of Knox County, Tenn.

[73] Assignee: Tutor Toys, Inc., Knoxville, Tenn.

[21] Appl. No.: 311,124

[22] Filed: Feb. 15, 1989

[51] Int. Cl.$^5$ ............................................. G09B 19/18
[52] U.S. Cl. .................................... 434/110; 434/201; 434/335; 434/202; 273/1 E; 235/7 A
[58] Field of Search ............... 434/201, 202, 107, 109, 434/110, 323, 335, ; 273/1 E, 237, 256, 278; 453/1, 2, 63; 235/7 A

[56] References Cited

U.S. PATENT DOCUMENTS

| | | | |
|---|---|---|---|
| 4,327,375 | 4/1982 | Leclerc | 358/106 |
| 4,358,273 | 11/1982 | Yamamoto | 434/201 |
| 4,403,965 | 9/1983 | Hawkins | 434/327 |
| 4,447,213 | 5/1984 | Culley | 434/201 |
| 4,456,259 | 6/1984 | Antal et al. | 273/256 |
| 4,457,719 | 7/1984 | Dittakavia et al. | 434/335 |
| 4,505,682 | 3/1985 | Thompson | 434/335 |
| 4,521,197 | 6/1985 | Lumpkins | 434/110 |
| 4,775,321 | 10/1988 | Comeaux et al. | 273/255 |
| 4,799,890 | 1/1989 | Thompson et al. | 434/304 |

FOREIGN PATENT DOCUMENTS

| | | | |
|---|---|---|---|
| 2020077 | 11/1979 | United Kingdom | 434/169 |
| 2151054 | 7/1985 | United Kingdom | 273/273 |

OTHER PUBLICATIONS

"Synthetic Speech", Popular Science, 3/79, p. 153.

Primary Examiner—Edward M. Coven
Assistant Examiner—Dean Small
Attorney, Agent, or Firm—Pitts and Brittian

[57] ABSTRACT

An electronic learning device (10) for teaching how to handle money is provided. A student provides input to the device, in a preferred embodiment, by a plurality of keys (40) which select the learning activity and its difficulty level. In certain activities, the device (10) requests (visually and/or auditorily) the student to engage in randomly selected currency identification/manipulation problems. The student's response is compared with the correct response, and the information concerning the appropriateness of the response is provided to the student. In the case of erroneous response, the correct response can be presented to the student both arally and visually. A speech synthesizer (28) (and/or visual display)) (20) serve to generate a reguest to the student concerning the student's response. In the preferred embodiment, the device is provided with a plurality of operational modes ranging from merely generating an audible or visible signal identifying the ocrrect response to engaging in interactive activities and games related to money identification/handling problems.

16 Claims, 15 Drawing Sheets

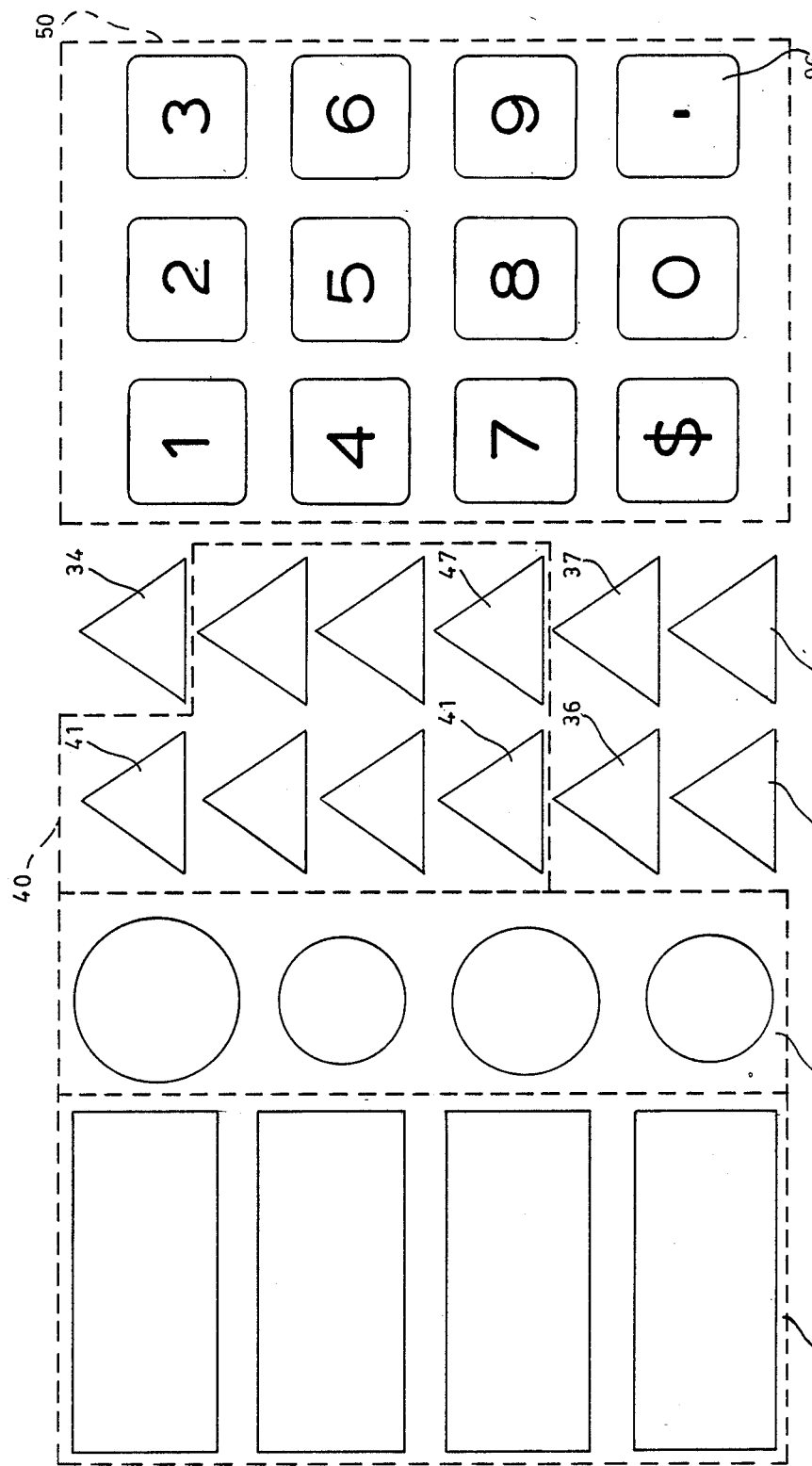

ELECTRONIC LEARNING DEVICE FOR TEACHING HOW TO HANDLE MONEY

DESCRIPTION

1. Technical Field

This invention relates to an electronic learning device, and more particularly concerns a synthesized speech device for teaching how to handle money.

2. Background Art

Electronic educational learning aid products have heretofore been known. These products are designed to deal with specific educational problems such as spelling, math, reading, or the like. Certain of these products have the capability of communicating with the student through synthesized speech. Known prior art generally relating to the field of speaking electronic educational products is described in the following U.S. patents: U.S. Pat. Nos. 4,505,682; 4,403,965; 4,457,719; 4,327,375; and 4,799,890.

To date, no known dedicated electronic learning devices are directed toward the specific problem associated with teaching students how to handle money. As will be recognized, the handling of money presents special problems in the tutorial field in that the quantity and/or size of coins and/or bills (i.e., currency) do not, of themselves, represent any value, which fact must be dealt with by both the teaching device and the student.

Accordingly, it is an object of the present invention to provide an electronic learning device for teaching students to handle money.

It is a further object of the present invention to provide such a device with a visual display of the numeric and currency symbols that correspond to money concepts in practice at the present time.

It is another object of the present invention to provide such a device which speaks the correct response to a student's input, directions for incorrect responses, encouragement, prompting, and praise.

It is another object of the present invention to provide such a device with a plurality of input-signaling switches, specially marked to resemble coins and bills, as well as numeric and instructional markings.

In order to maintain the interest of the student, the money-handling teaching device of the present invention is provided with a plurality of operational modes which range from merely displaying dollar and cent values, to providing students with game-like exercises to increase the enjoyment of the learning experience. Accordingly, yet another object of the present invention is to provide the student with a variety of stimulating educational experiences serving to enhance his/her ability to correctly handle money.

DISCLOSURE OF THE INVENTION

Other objects and advantages will be accomplished by the present invention which provides an electronic learning device to develop and/or enhance a student's ability to perform all the operations inherent in the process of handling money. The electronic device of the present invention includes, in a preferred embodiment, a keyboard upon which a student can select an activity and its level of difficulty. Also, integrally included on said keyboard are keys with which a student can make an input signal to said electronic device, signifying his/her choice of responses to prompts from said electronic device. Said keys include numerals, decimal point, dollar sign, facsimiles of one, five, ten and twenty dollar bills, etc., and facsimiles of one, five, ten, and twenty-five cent, etc., coins in a preferred embodiment. However, other embodiments may also include such coin/currency symbol likenesses for other countries of the world, as well. The student is requested in one mode of operation to engage in specific money-handling problems which are randomly selected. The student's response to each such request generates a specific code which is compared to the correct response stored in memory or computed by the electronic learning device. A speech synthesizer serves to effect his/her request and comments on the appropriateness of the responses by the student. In the preferred embodiment, various modes of operation are provided.

BRIEF DESCRIPTION OF THE DRAWINGS

FIG. 4 shows function/feature keys comprising the student-operable input mechanism of the device.

BEST MODE FOR CARRYING OUT THE INVENTION

Figure 1:
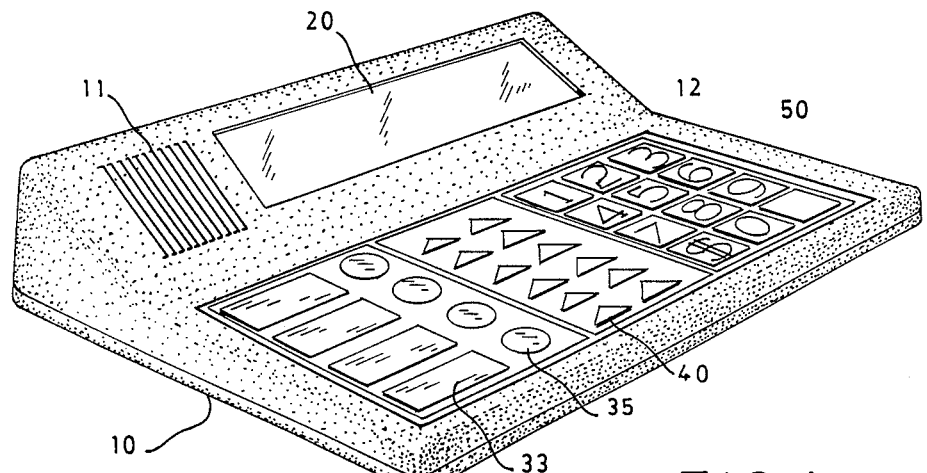
FIG. 1 illustrates an electronic learning device constructed in accordance with various features of the present invention, including a proposed face of the device, and displays the student-operable input mechanisms.
Figure 2:
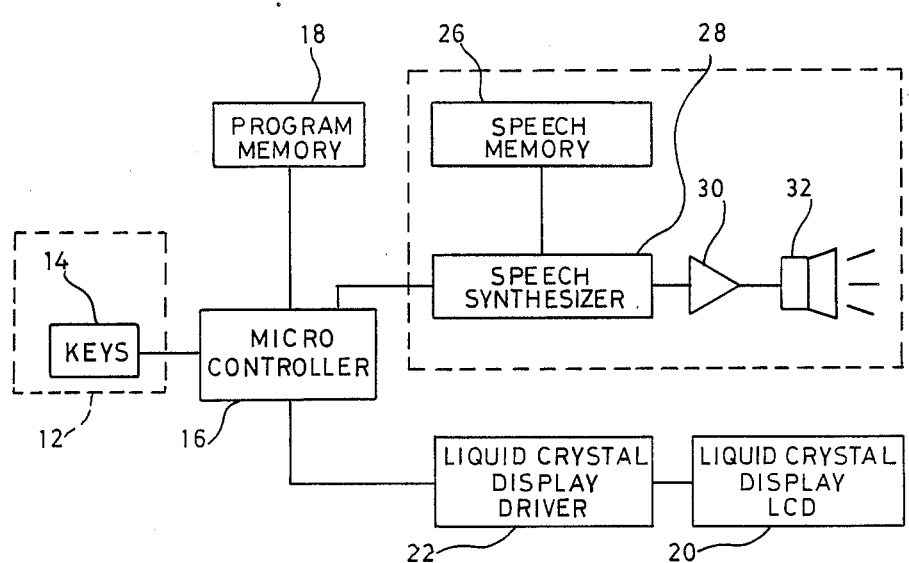
FIG. 2 illustrates a block diagram of an electronic learning device for teaching how to handle money.

An electronic learning device constructed in accordance with various features of the present invention is illustrated generally at 10 in FIG. 1 and in the block diagram of FIG. 2. This device is particularly designed to teach students how to handle money, and will be described first in terms of its components and then in connection with its operational modes.

Referring first to FIG. 1, it will be seen that the proposed face of the device 10 comprises input means 12, display means 20, and a speaker grill 11. It will be seen that said input means 12 includes BILL keys 33, COIN keys 35, ACTIVITY keys 40, and a numeric key pad 50.

Referring now to FIG. 2, input into the device 10 is accomplished by input means generally indicated at 12. In the preferred embodiment, said input means comprises keys 14 (33, 35, 40 and 50 of FIG. 1) which serve to energize the system, and perform various other input functions as more clearly delineated below and in FIG. 4. These input functions are decoded by a microprocessor 16 and acted upon pursuant to rules defined in the product program stored in memory 18 and depicted in the flow charts of FIGS. 3A through 3M. The inputs to microprocessor 16 are all digital signals having one or two discrete levels in the preferred embodiment. The microprocessor 16 in the preferred embodiment is a single-chip, 8-bit, 4-K byte ROM (Read Only Memory) CMOS (Complementary Metal Oxide Semiconductor) MCU (Micro Computer Unit) microprocessor, Model Z86C10, which is available from Zilog Corporation.

Visual communication to a student using the device is accomplished by writing to the Liquid Crystal Display (LCD) 20, illustrated diagrammatically in FIG. 2. To this end, use is made of an LCD driver 22 which is commonly available in the art in the form of an integrated circuit of the HD44780 dot matrix, driver/controller type. The Liquid Crystal Display 20 comprises a custom 5×7×16×1 dot matrix character readout in the preferred embodiment.

Program memory 18 can be combined into the single-chip microcomputer 16 above.

Audible communication to a student is accomplished by the auditory communication section 24. This auditory communication section responds to requests made by the microprocessor 16. Such requests can be prompted by stud input through input means 12 and/or by command stored in memory 18. Speech memory 26 contains digital data representing digital speech from which synthesized speech is derived. This speech relates to a plurality of money-handling the correct responses thereto, and comments upon the appropriateness of such responses made by a student as proposed answers to specific money-handling requests or questions. Moreover, information concerning money handling is stored in speech memory 26. A suitable speech memory is provided by the using of two Model SPR 128, 128 K bit CMOS ROM (Complementary Metal Oxide Semiconductor, Read Only Memory) chips available from Microchip Corporation. This particular memory provides digital auditory information to speech synthesizer 28 which in turn generates the auditory requests and comments produced by the device in the form of spoken and synthesized words. Two units of this Model SPR 128 serve as a suitable memory for a single-chip speech synthesizing system/processor.

The synthesizer 28 utilizes the digital information to synthesize an analog sound waveform which it provides to conventional amplifier 30. A suitable amplifier consists of Model LM386, a single-chip, low voltage, audio power amplifier available from National Semiconductor Corporation. This amplifier provides the analog signal at a suitable level to a conventional speaker 32 for generation of the audible communication produced by the device 10.

When it is desired to use the device 10, a student will initially activate the input means 12 and more specifically, the ON key 34 in FIG. 4. Upon the pressing of this key, the device acknowledges to the student/operator that it is ready for additional input by speaking the name of the device which is concurrently displayed in a display 20, followed immediately thereafter by the speaking of the level of difficulty while that, too, is displayed in a display 20 (FIG. 1). Key 38 is the LEVEL key and is used by the student or operator to select the level of difficulty of the chosen activity. In this regard, there are several levels of difficulty, ranging from Level 1, which is the least difficult, to the highest numbered level, which is the most difficult. Communication of the level selected is provided by displaying the appropriate level on the display 20 in combination with the speaking of the selected difficulty level. Key 37 is the CHECK key which provides the student/operator with an indication, after responding to the device's request or question relating to a particular activity, of the appropriateness of the response. Pressing the CHECK key 37 causes the device to check the correctness of the response and comment on its appropriateness with respect to the particular money handling problem or request made by the device. If the response is correct, the device speaks a praise message and, if the response is incorrect, a phrase of encouragement is spoken by means of a message such as "Try Again" or the like. After a selected number of attempts, depending on the activity, the system in the preferred embodiment gives the correct response to the student as part of the learning process. The ACTIVITY keys are generally indicated at 40 in FIGS. 1 and 4. These keys are used by a student to select a specific activity or mode of operation of the device. It will be noted that a variety of activities and/or operational modes may be made an operational part of the device 10. The activities and/or operational modes described in the following paragraphs are for illustration purposes only and are not intended to limit the scope or number of such activities and/or operational modes that may be utilized by the device 10. Where strong similarities or duplication of procedural steps occurs between the several exemplary activities, some of said duplications may not be repeatedly described in the subsequent activities.

Key 36 is the ERASE key, used by the student to clear the temporary input data held in storage by the microprocessor 16. Key 39 is the REPEAT key used by the student to require the device 10 to repeat the last previously generated auditory statement.

The COIN keys are indicated generally at 35 in FIGS. 1 and 4. These keys are designed to resemble coins having the values of one, five, ten, and twenty-five cents, respectively in the illustrated embodiment. The student presses one or more of these keys in response to appropriate stimuli portions of the particular activity selected.

The BILL keys are indicated generally at 33 in FIGS. 1 and 4. These keys are designed to resemble currency bills having the values of one, five, ten and twenty dollars, respectively in the illustrated embodiment.

The student presses one or more of these keys in response to appropriate stimuli portions of the particular activity selected.

The numeric keypad is indicated generally at 50 in FIGS. 1 and 4. These twelve keys are used by the student to input codes into the device 10 that represent the numerical values zero through nine, as well as the decimal point and the dollar sign.

The device 10 is ready to be used when either batteries or the optional external power necessary to energize the unit is installed and the power ON key 34 is pressed. The flow charts depicted in FIGS. 3A through 3M illustrate the modes of operation of the device 10 in the preferred embodiment.

While the flow charts can be easily read by those skilled in the art, the system operation based on the rules depicted in the charts will be discussed. However, it should be noted that the flow charts depict a preferred operational embodiment, and can disclose specific timing of events and numbers of tries greater than specified digits of the preferred embodiment. These specific references are enclosed as examples only and are not intended to limit the scope of the invention.

Figure 3A:
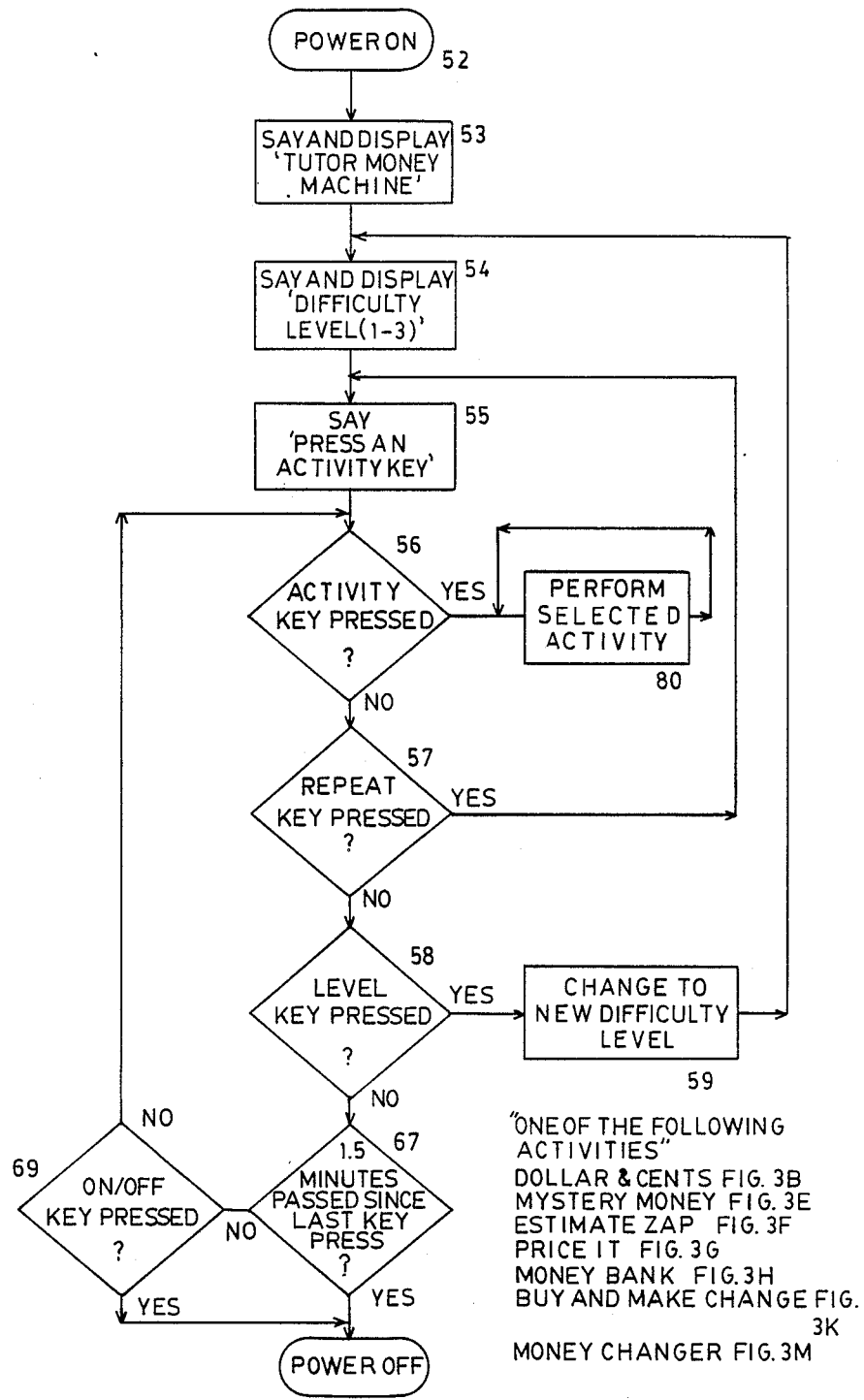
FIGS. 3A through 3M each illustrate a part of a flow chart of operational steps of the device.

Initially, the student presses the ON key 52 (FIG. 3A). The device responds by speaking and displaying the device name 53. This is followed by the device's simultaneously speaking and displaying the difficulty level 54. Subsequent to this, the device speaks the prompt "Press An Activity Key" 55.

Throughout the flow chart diagrams, it will be observed that the student can make one of several choices. In the embodiment shown in FIG. 3A, one of the choices is the pressing of the LEVEL key 58. In this case, the unit changes to the next higher difficulty level 59, which it speaks and displays to the student. In this particular instance, the device will speak and display "Level 2" at 54.

The student can choose to press the REPEAT key 57 which would cause the unit to repeat certain previously spoken phrases. In this case, the prompt "Press An Activity Key" 55 would be repeated.

Figure 3B:
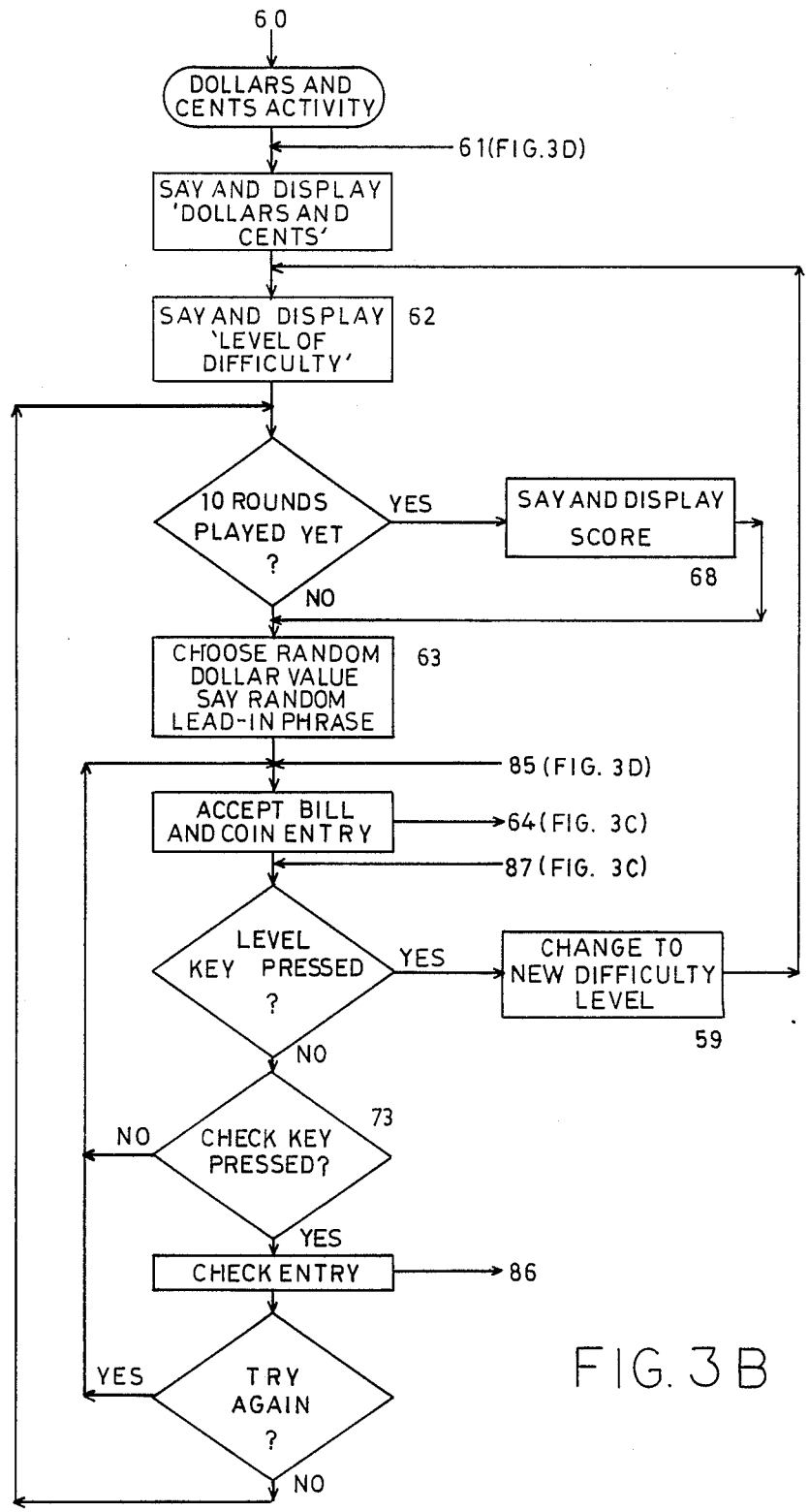
Figure 3C:
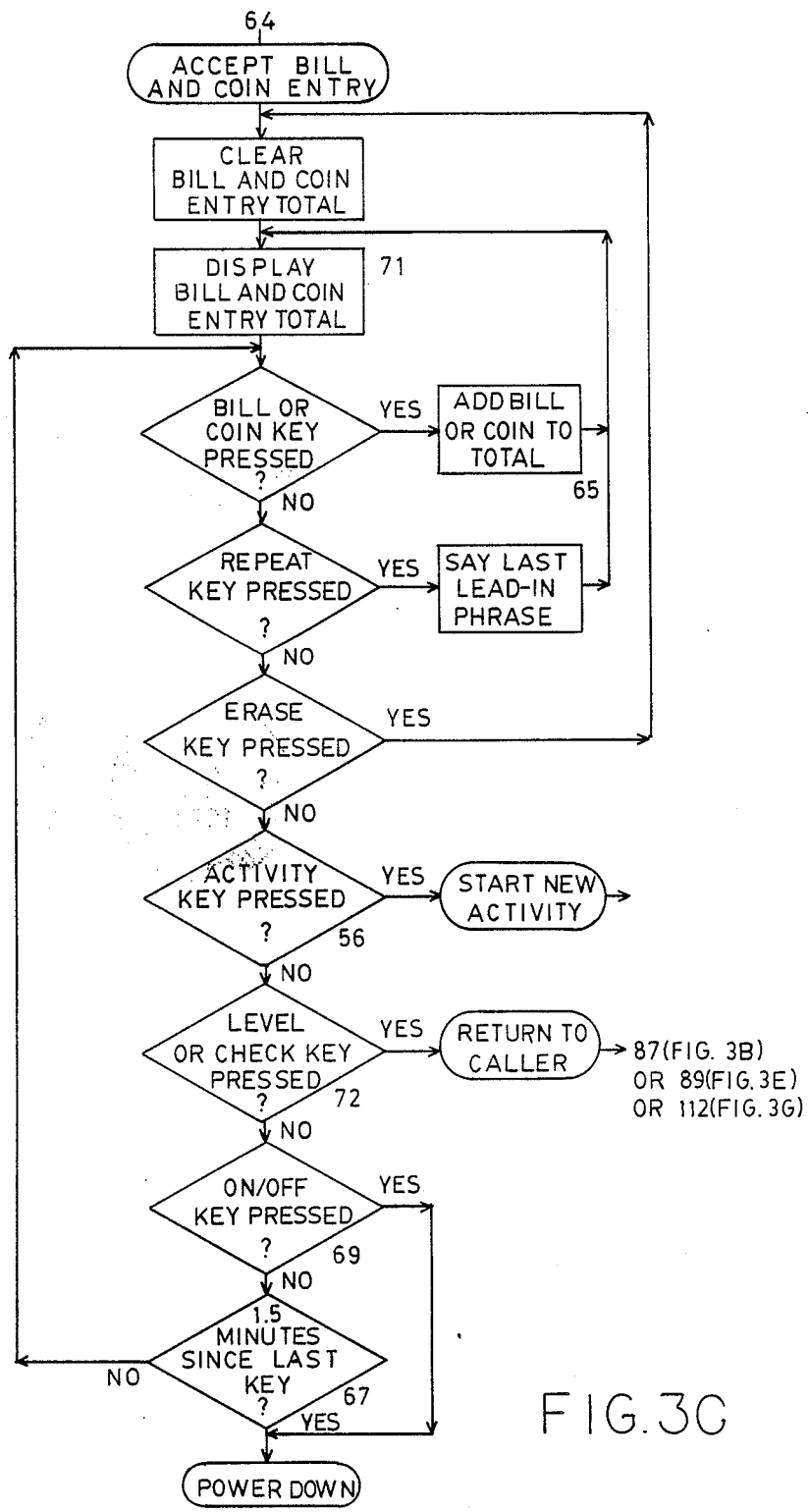
Figure 3D:
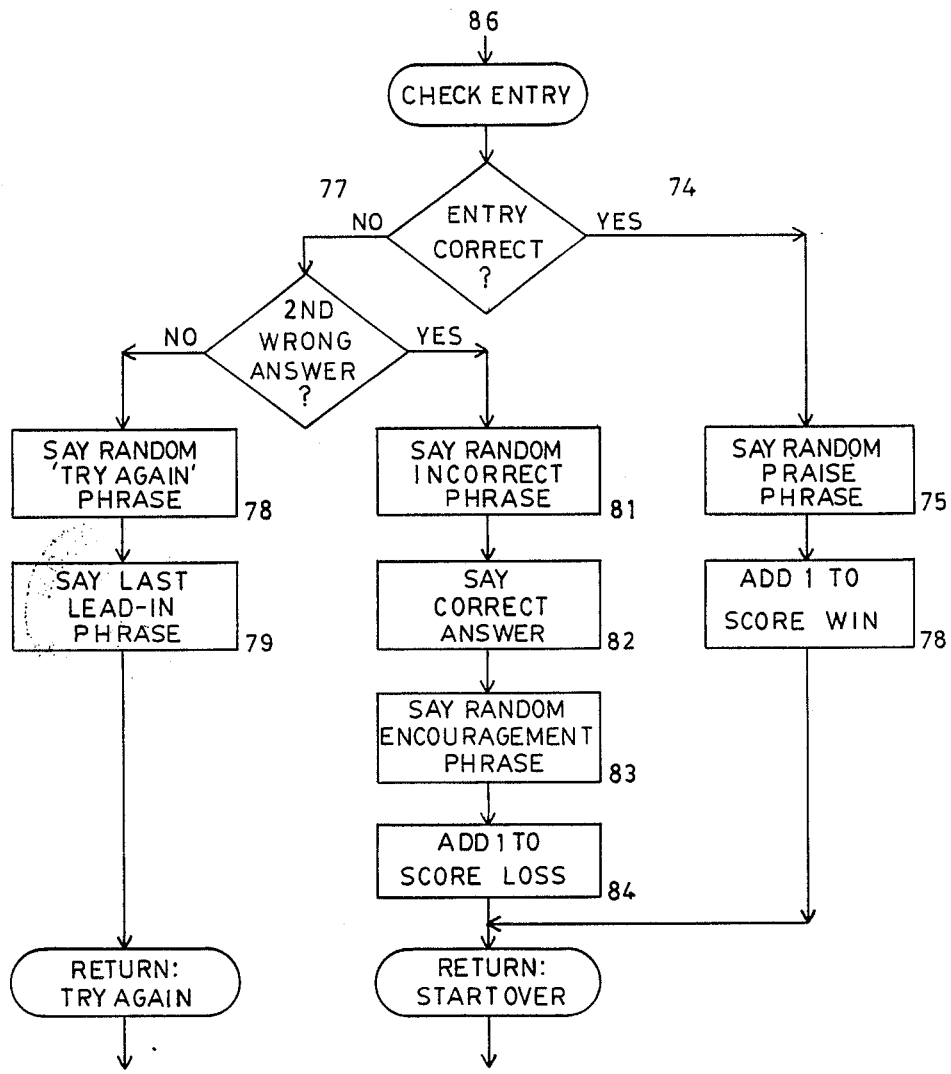

At any point in time, the student can go on to any of the other features of the product 10 For example, he may press the "Dollars and Cents" activity key 7 (see FIG. 4). In this case, shown in FIG. 3B, the unit speaks and displays the name of the activity chosen 61, after which the unit also speaks and displays the level of difficulty that has been selected 62, i.e., "Dollars and Cents, level 2". After these announcements, the unit proceeds to present a dollar value problem to the student 63. The value could be one stored in memory or it could be configured by the unit on the rules defined by the activity and generated by the algorithm/memory. For example, the unit may display a value of, say five dollars, on the display 20, and speak a random lead-in phrase 63. The student is expected to match the value by pressing the appropriate key or keys 33. After the student has made a selection, the device responds by adding together and displaying 65 (FIG. 3C) the total value of all keys pressed 71. The student then affirms the response by pressing the CHECK key 37. It will be observed that the unit would have taken one of the various previously discussed alternatives indicated on the flow chart if the student had exercised his option to press any of the other keys. How , following the pressing of the CHECK key 37, the unit determines the correctness of the response and communicates that to the student. This is indicated on the flow chart at 73 on FIG. 3B and then at 74 on FIG. 3D. Continuing with FIG. 3D, if the response was at 74, the unit will speak a praise phrase, such as "Great, That's Correct" 75, and, after updating the WIN score 76, follow with another value item to be matched within that activity and at that level. If the response is not correct 77, the unit communicates that fact with a statement like "That's Not It, Try Again" 78, or the like, which is followed by a repeat of the last lead-in phrase 79. If, after the second try, the student's response is still incorrect 80, the unit generates another random "incorrect" phrase 81, the correct in memory 83, increments the loss score counter 84, and starts that activity over again 85, which is 61 on FIG. 3B. It will be observed that play may continue indefinitely in a selected activity as long as a key is pressed at least once every one and a half minutes 67 (FIG. 3C). After a selected number of rounds (every tenth round in the preferred embodiment), the score will be spoken and displayed 66 (FIG. 3B).

Figure 3E:
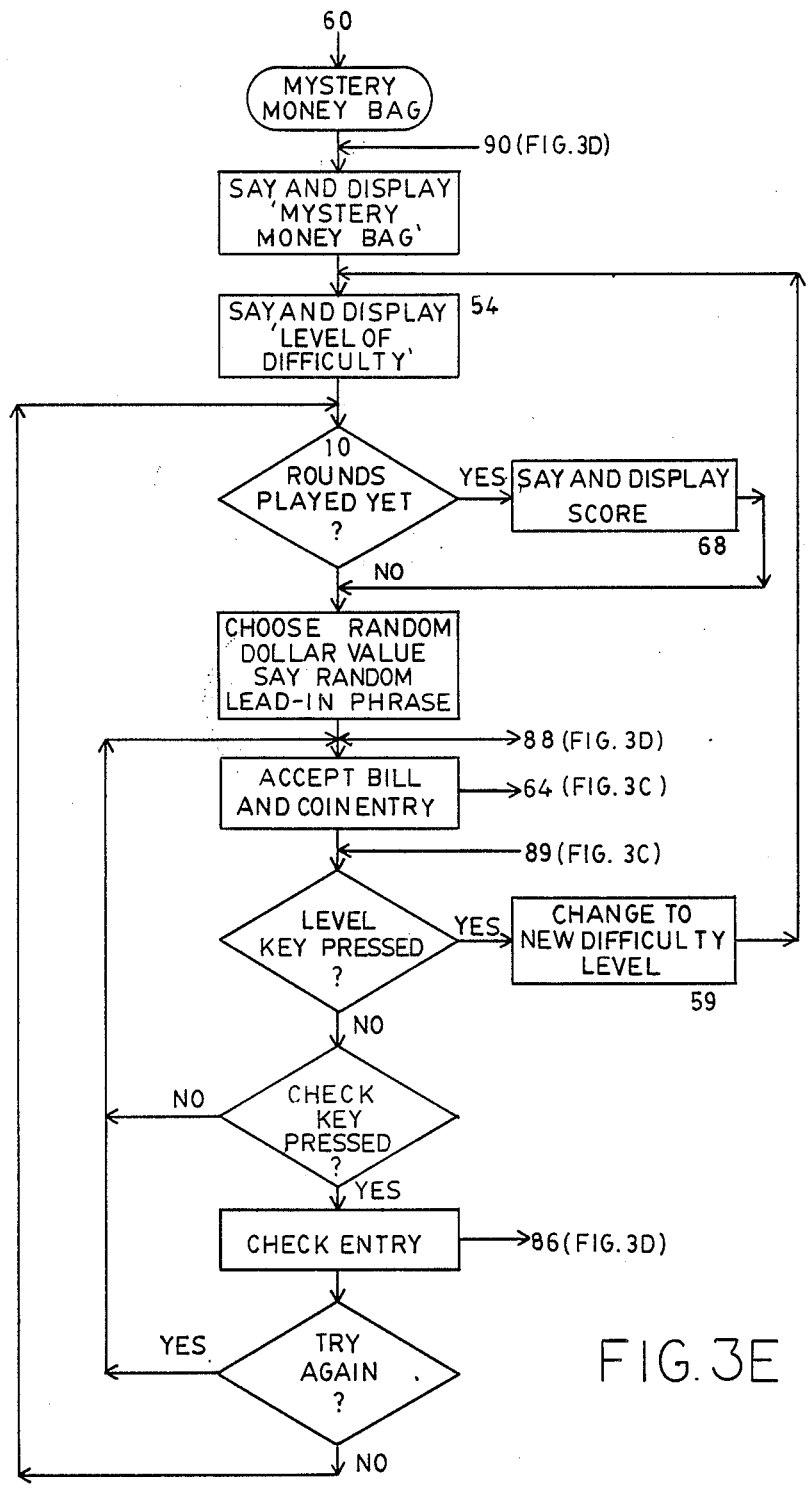

When it is desired to select another activity, pressing the appropriate key 56 (FIG. 3A) will immediately switch the unit to that mode, for example, the "Mystery Money Bag" activity, the flow chart of which is diagrammatically illustrated at FIG. 3E, and which begins with the unit's speaking and displaying the activity title 90 and the level of difficulty 54 (same as FIG. 3A). This activity is played with a similar operational scenario as "Dollars and Cents" but with a change in nomenclature to focus on different money value skills and provide variety to the student (in this possible combinations of bills and coins which comprise a given dollar value).

Figure 3F:
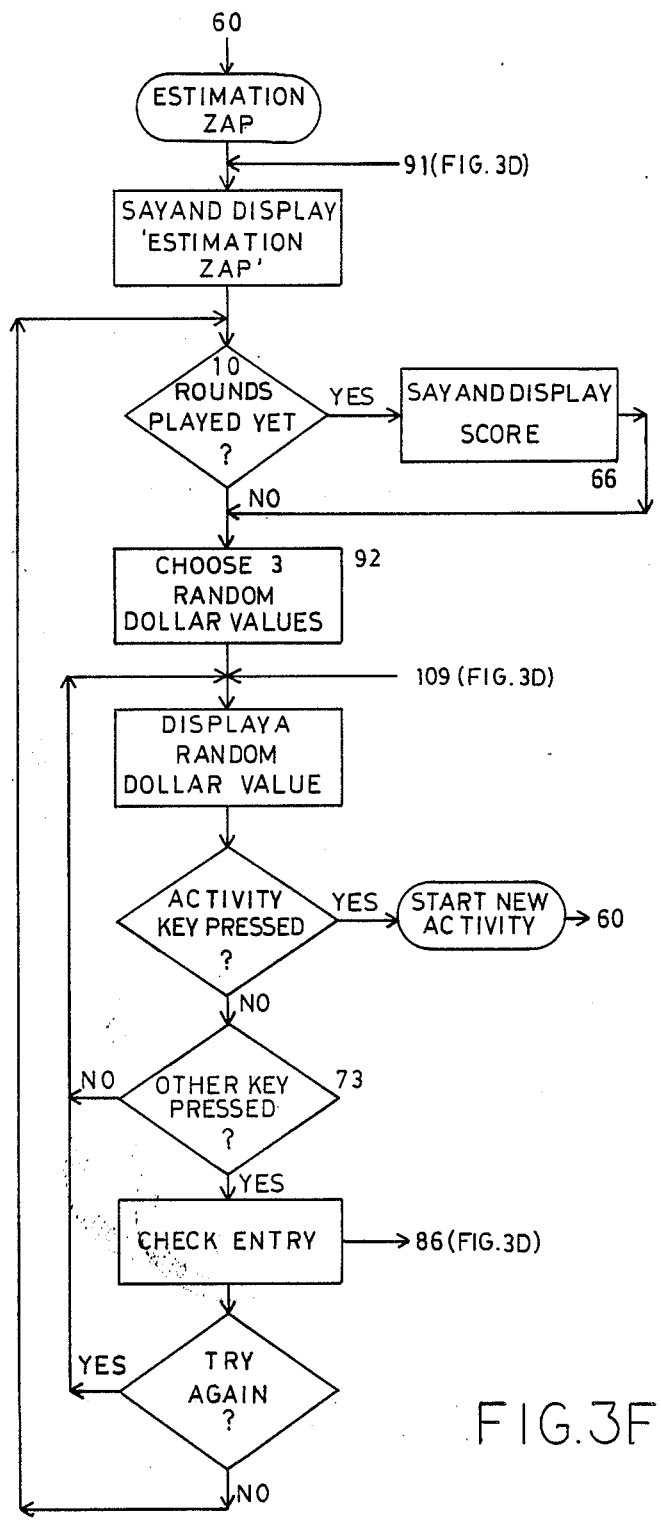

Selecting the third activity ESTIMATION ZAP 91 FIG. 3F provides practice for the learner by requiring the student to quickly round off running totals of a series of purchases and estimate the total cost, indicating the answer by choosing from one of three values which have been preselected by the unit at 92.

Still another activity, as illustrated by "Money Bank" 93 (FIG. 3H), can require the student to select and enter increasingly lengthy sequences of coins regardless of their dollar value. This activity can be structured to allow only a predetermined amount of time, say five seconds 94 (FIG. 3I), in which to make an entry. This feature could serve to enhance a student's recognition, memory/recall, and reaction skills.

Figure 3G:
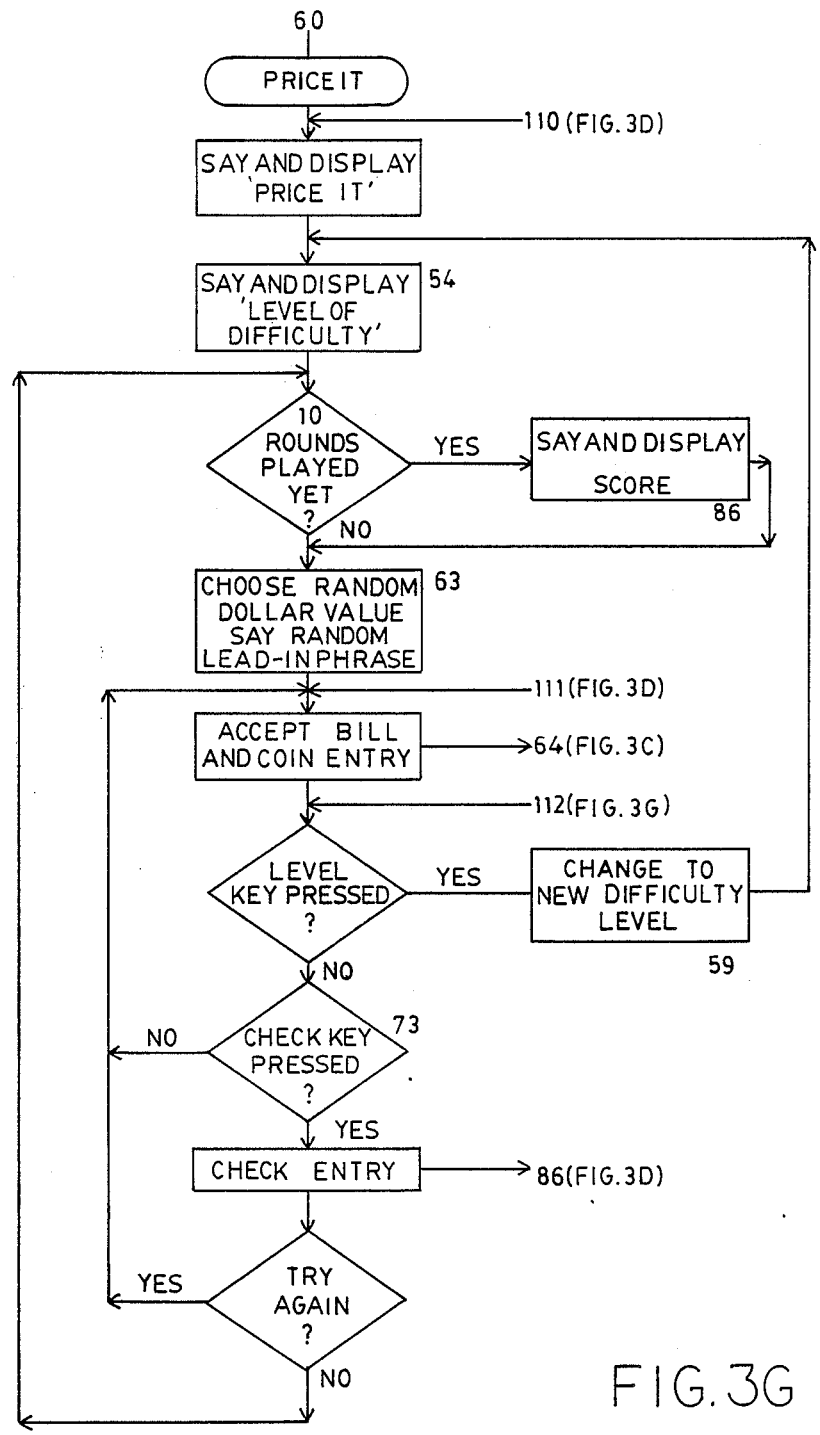
Figure 3H:
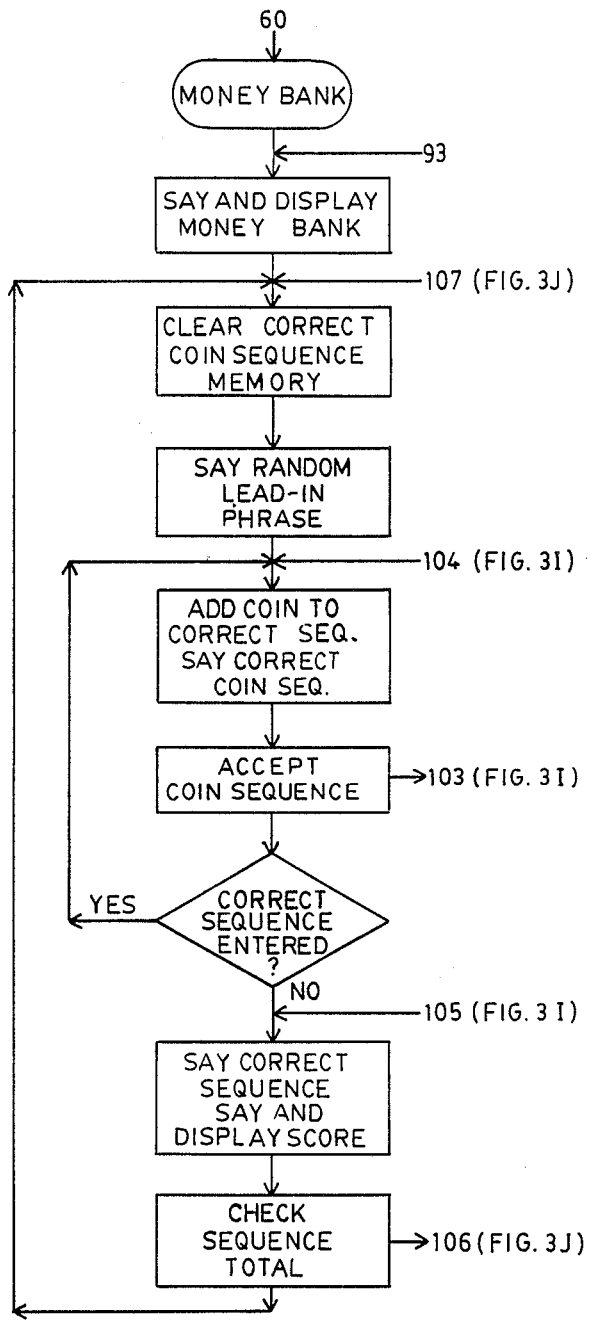
Figure 3I:
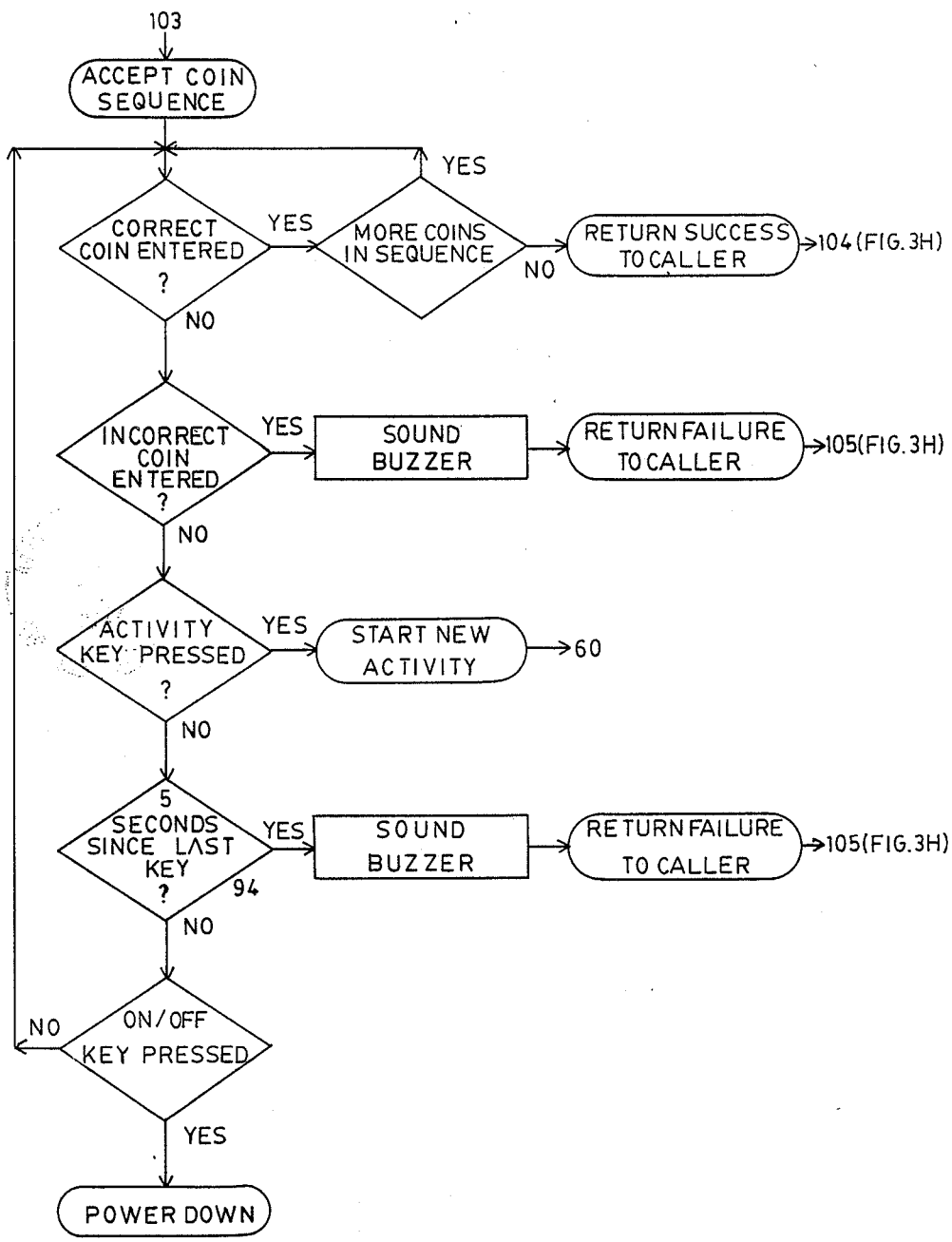
Figure 3J:
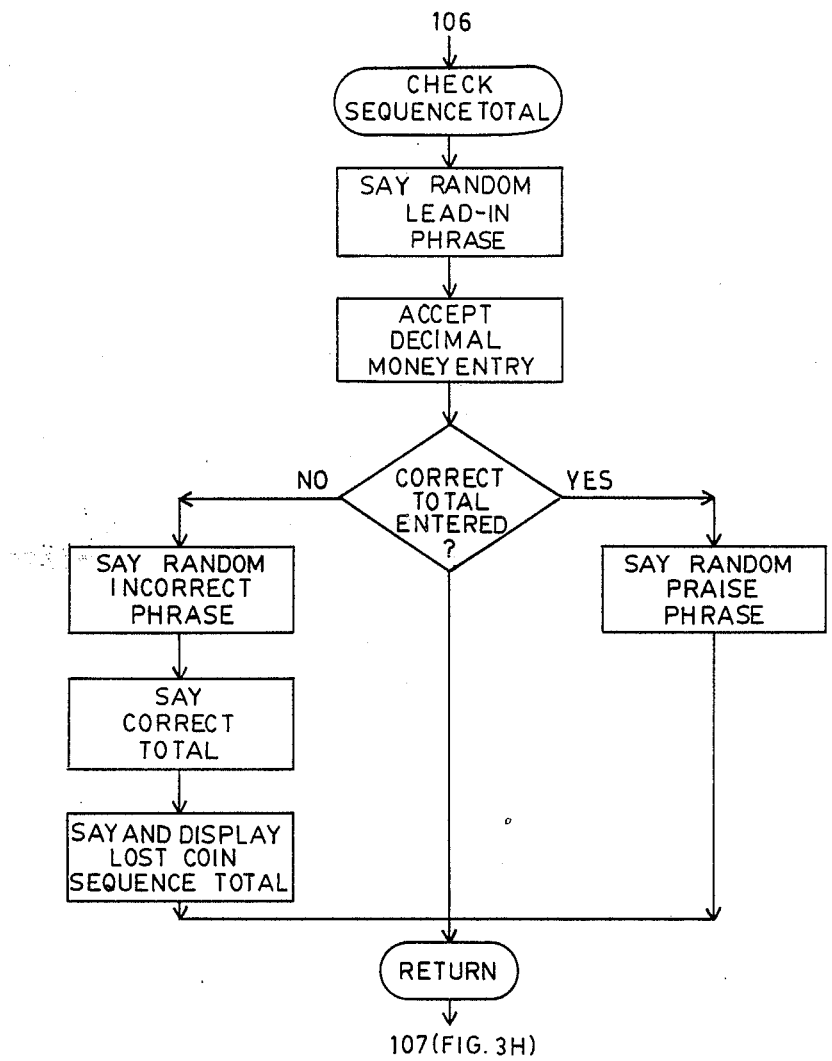

The "Price It" activity, diagrammatically illustrated at FIG. 3G, provides exercises in determining how quantities of coins and bills combine to form a price, and thus the ostensible value, of an item. This activity, as well as the others shown, makes use of certain common functions, i.e., the pressing of the LEVEL key or the CHECK key. These and other functions of the device 10, while necessarily common to all activities, are shown as separate steps in the flow charts. These include the "LEVEL key pressed?" and the "CHECK key pressed?" decision boxes. Thus, these functions are not individually described in each activity description. It can also be seen that more than one activity can utilize the procedures outlined in a particular flow chart. For instance, said "Price It" activity branches from the "Accept Bill and Coin Entry" 64 to the top of FIG. 3C 64 from where return to the flow of FIG. 3G will only occur upon the pressing of the LEVEL or CHECK keys as at 72 (FIG. 3C). The procedures of flow chart 3C can also be invoked by the "Dollars and Cents" activity (FIG. 3B) or the "Mystery Money Bag" activity (FIG. 3E). In this case, however, return from the decision box 72 of FIG. 3C is to the "Price It" activity, FIG. 3G, at 112. Obviously, if the key pressed at 72 had been the LEVEL key, the level of difficulty would have been incremented and operation continued in the new level. If the key pressed at 72 had been the CHECK key, flow would have branched at 86 (FIG. 3B) to FIG. 3D. A correct entry would have elicited the praise phrase 75 and a score increment 76 before returning 110 (FIG. 3B). An incorrect entry would have earned a "try again" phrase 78 and a repeat of the last lead-in phrase 79 before returning at 111 (FIG. 3G). A second consecutive wrong answer (see FIG. 3D) would have caused the generation of an "Incorrect" phrase 81, the correct answer 82, an encouragement phrase 83, an increment to the number of losses 84, and a return at 110 (FIG. 3G).

Figure 3K:
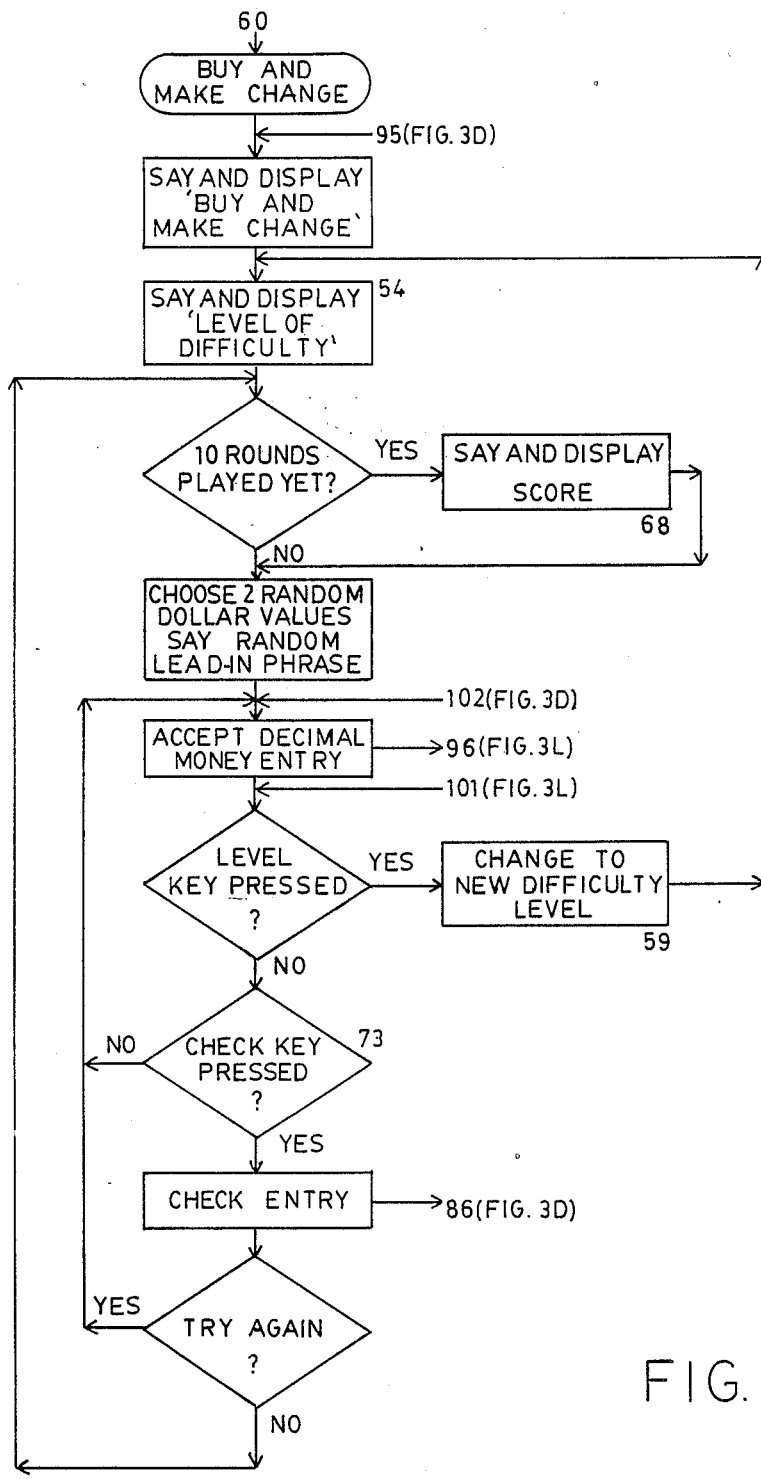
Figure 3L:
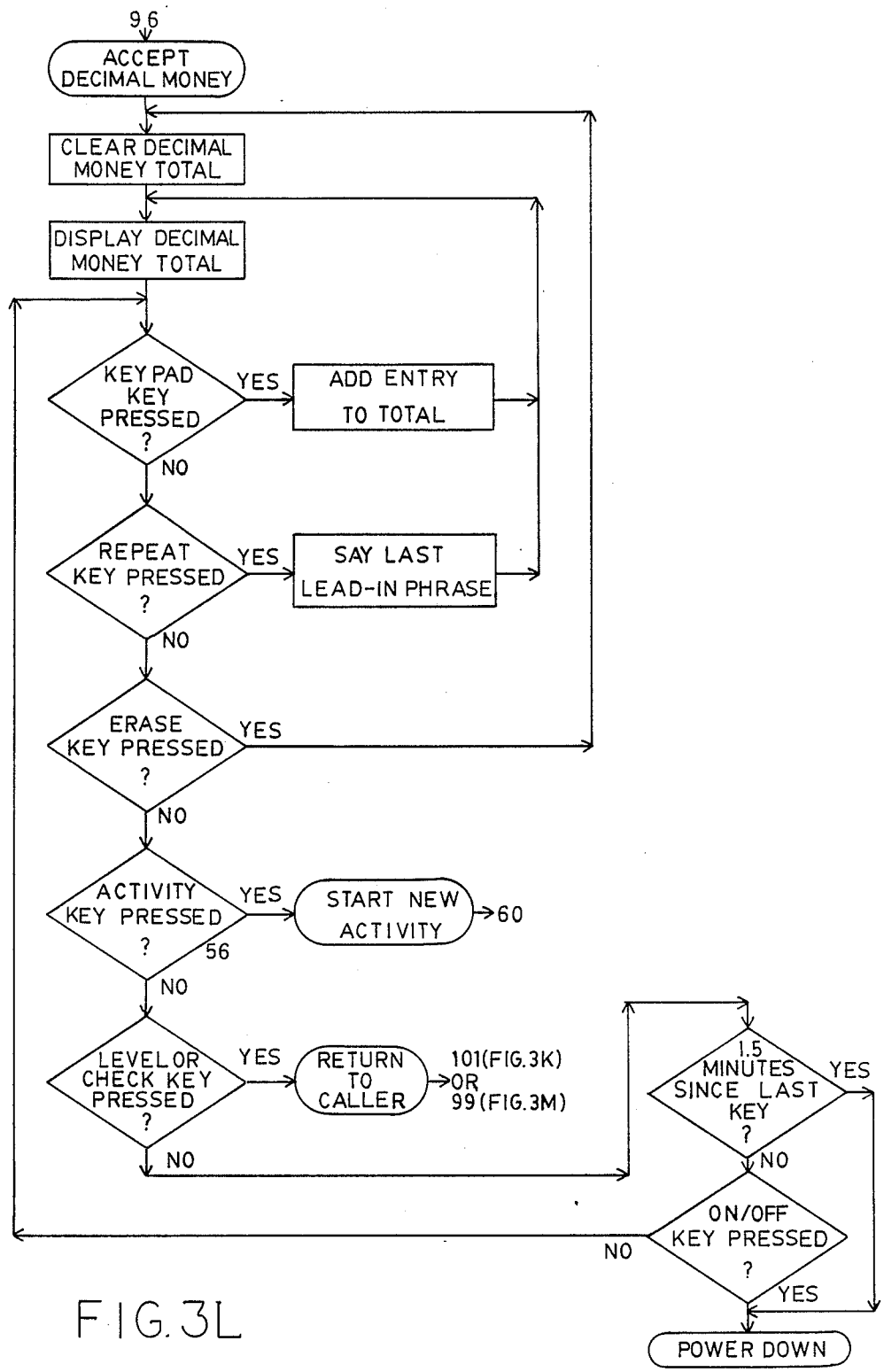

The "Buy and Make Change" activity 95 in FIG. 3K requires in addition to previously described procedures, the utilization of the decimal key 96 (FIG. 3K) and 96 (FIG. 3L) in order to arrive at the correct responses. This activity provides practice for the child in counting money to purchase items, making change, making change with the least number of coins, and correct money notation.

Figure 3M:
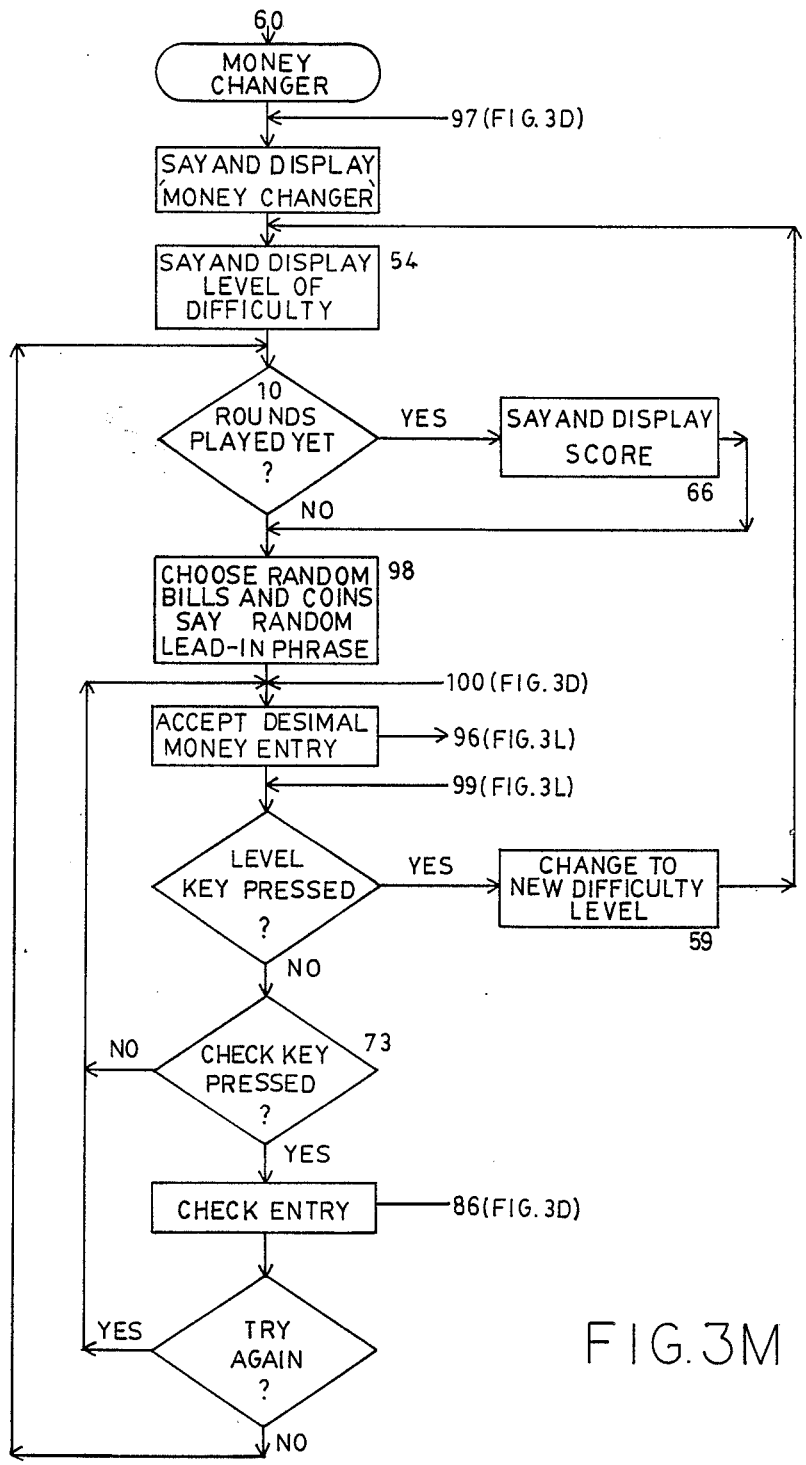

The final example activity ("MONEY CHANGER") to be illustrated is at 97 in FIG. 3M. This activity, while also utilizing functions common to the foregoing activities diagramed, specifically involves the mixing of coins and bills as may be seen at 98 and provides practice in recognizing the quantities of particular coins/bills that are in a particular money value.

One feature of the device, as has already been noted, is the keeping of the score 66 (FIG. 3B). In this respect, both the number of correct responses and the number of incorrect responses is tabulated and displayed. The score counter can be cleared by changing activities or by powering down the device.

From the foregoing detailed description, it will be recognized that an electronic learning device for teaching children how to handle money has been provided. The device is a dedicated learning aid, and incorporates various modes of operation. In the preferred embodiment, activities are selected by the student and corresponding tasks are presented by the device for response by the student. This includes numerical values and symbol recognition conclusions by the student, and provides comments on the student's response by use of a microprocessor-driven speech memory. Thus, the device is designed to maintain the interest of the student and to provide the student with game-like exercises which increase the pleasure of the learning experience.

While a preferred embodiment of an electronic learning device for teaching how to handle money has been shown and described, it will be understood that there is no intent to limit the invention to such a disclosure, but rather, it is intended to cover all modifications and alternate constructions falling within the spirit and scope of the invention as defined in the appended claims.

We claim:

1. An electronic learning device for teaching monetary management skills involving currency and coins, comprising:
   student input means for generating input codes representative of monetary values and of selected monetary management skills;
   interrogation means responsive to said input codes generated by said student input means to request said student to engage in a selected money transaction problem, wherein each money transaction problem has a plurality of possible correct responses;
   comparison means for receiving, and being responsive to, specific codes generated by said input means in response to said request to determine if said specific codes corresponds to one of a plurality of possible correct student responses to said money transaction problem; and
   means connected to said interrogation means and said comparison means to communicate with said student said request and comment on the appropriateness of said response by said student to said money transaction problems.

2. The device of claim 1 wherein said input means utilizes appropriately authorized coin and currency likenesses of a selected monetary system reproduced upon said input means.

3. The device of claim 1 wherein said means to communicate with said student includes speech synthesis means and said selected money transaction problems are word problems.

4. The device of claim 1 wherein said means to communicate with said student includes visual display means.

5. The device of claim 1 wherein said comparison means includes means for scoring responses of said student to said requests generated by said interrogation means.

6. An electronic learning device for teaching money management skills involving currency and coins, comprising:
   student input means having first input means for generating an input code representative of a selected money management skill activity and further input means for generating codes representative of money symbols;
   interrogation means responsive to said input codes generated by said student input means to request said student to engage in a selected money transaction problem, wherein each money transaction problem has a plurality of possible correct responses.
   comparison means for receiving, and being responsive to, specific codes generated by said further input means in response to said request to determine if said specific codes correspond to one of a plurality of possible student responses to said money transaction problem; and
   speech synthesis means and visual display means connected to said interrogation means and said comparison means to communicate to said student said request and comment on the correctness of the response by said student to said selected money transaction problem.

7. An electronic learning device for teaching money management skills involving combinations of currency and coins, comprising:
   student input means having first input means for generating an input code representative of a selective activity related to said money management skills, and further input means for generating an input code representative of selected numerical values of said currency and coins;
   interrogation means for receiving and being responsive to said code generated by said student with said first input means as to said selected activity to request said student to engage in a selected money transaction word problem, wherein each money transaction word problem has a plurality of possible correct responses.
   comparison means for receiving, and being responsive to, specific codes generated by said further input means in response to said request to determine if said specific codes correspond to one of a plurality of possible student responses to said money transaction word problem; and
   speech synthesis means and visual display means connected to said interrogation means and said comparison means to communicate with said student as to said request, and comment on the correctness of the response by said student to said money transaction word problems.

8. The device of claim 7 wherein said first input means includes input means for generating an input code representative of a selected activity difficulty level for said money transaction word problems.

9. The device of claim 7 wherein said further input means includes keys for operation by said student, said keys marked with authorized coin and currency likenesses, said keys each generating a code representative of a numerical value of said coin and currency likenesses.

10. An electronic learning device for teaching a student monetary management skills including various monetary transactions involving currency and coins, which comprises:
    student input means for generating input codes representative of selected of said monetary transactions and input codes representative of solutions to monetary transactions problems within said monetary transactions, wherein each money transaction has a plurality of possible correct solutions.

microprocessor means for receiving said input codes generated by said student input means, for posing a money transaction word problem to said student within said selected of said monetary transactions and for generating signals for communication with said student as to said money transaction word problem and response as to correctness of said solution chosen by said student compared to said plurality of correct possible solutions to said monetary transaction word problem; and communication means for receiving said communication signals and for communication with said student as to said money transaction word problems and solutions by said student to said money transaction word problems.

11. The device of claim 10 wherein said communication means comprises a voice synthesizer means for generating audible communication to said student, and visual display means for communication with said student.

12. The device of claim 10 wherein said microprocessor means is a microcomputer, comprising:

means for selecting a representative money transaction word problem within a money management skill activity selected by said student;

means for determining multiple correct solutions to said selected money transaction word problem;

means for analyzing a solution to said selected word problem by said student and comparing said solution of said student with said multiple correct solutions; and means for generating communications signals to said student, using said communication means, as to said selected representative word problem and as to correctness of said solution of said student.

13. The device of claim 12 wherein said communication means comprises a voice synthesizer means for generating audible communication to said student, and visual display means for communication with said student.

14. The device of claim 12 wherein said student input means further provides input codes to said microcomputer of a level of difficulty selected by said student for said selected activity, and said means for selecting a representative word problem utilizes said input code as to said selected level of difficulty in selecting said representative word problem.

15. The device of claim 14 wherein said input means includes key means operable by said student, said key means comprising:

activity selection keys for selecting an activity within said money management skills;

level of difficulty keys for selecting a level of difficulty within said money management skills, and keys marked with authorized currency and coin likenesses whereby said student indicates a solution to said representative word problem posed by said means for selecting said representative word problem.

16. The device of claim 12 wherein said means for determining multiple correct solutions to said selected word problems determines a preferred correct solution, and wherein said means for analyzing a solution of said student determines if said solution of said student corresponds with said preferred correct solution.

* * * * *